(12) United States Patent
Ajiki et al.

(10) Patent No.: US 8,496,251 B2
(45) Date of Patent: Jul. 30, 2013

(54) SEALING SYSTEM

(75) Inventors: Kenichi Ajiki, Kitaibaraki (JP);
Yoshiyuki Abe, Kitaibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/004,055

(22) Filed: Jan. 11, 2011

(65) Prior Publication Data
US 2011/0169226 A1 Jul. 14, 2011

(30) Foreign Application Priority Data
Jan. 12, 2010 (JP) ................... 2010-004005

(51) Int. Cl.
*F16J 15/32* (2006.01)
(52) U.S. Cl.
USPC ........................................... 277/549
(58) Field of Classification Search
USPC .................................. 277/549, 562
See application file for complete search history.

(56) References Cited

U.S. PATENT DOCUMENTS

| 3,169,776 | A | * | 2/1965 | Felt | 277/468 |
| 4,055,107 | A | * | 10/1977 | Bartley | 92/86.5 |
| 6,290,235 | B1 | * | 9/2001 | Albertson | 277/510 |
| 7,083,170 | B2 | * | 8/2006 | Borstel et al. | 277/589 |
| 2009/0166984 | A1 | * | 7/2009 | Matsui et al. | 277/562 |

FOREIGN PATENT DOCUMENTS

| JP | S59-22360 | 2/1984 |
| JP | H05-14050 | 5/1993 |
| JP | H05-83410 | 11/1993 |
| JP | 2001-355739 | 12/2001 |

* cited by examiner

*Primary Examiner* — Gilbert Lee
(74) *Attorney, Agent, or Firm* — Harness, Dickey & Pierce, P.L.C.

(57) ABSTRACT

A sealing system is provided which is intended to achieve an improvement in durability. A dust seal is composed of a first dust seal and a second dust seal which is arranged at a location nearer to an atmospheric air side than the first dust seal, wherein each of the first dust seal and the second dust seal has a seal lip formed so as to be slidable with respect to an outer peripheral surface of the shaft. The first dust seal has seal lips made of urethane rubber, and the second dust seal has only a single seal lip which is made of a rubber higher in flexibility than urethane rubber, and which extends toward the atmospheric air side.

6 Claims, 4 Drawing Sheets

SEALING SYSTEM

BACKGROUND OF THE INVENTION

1. Field of the Invention

The present invention relates to a sealing system provided with a dust seal.

2. Description of the Related Art

For example, in oil hydraulic cylinders for construction machinery, a sealing system comprising a plurality of seals is used so as to seal an annular gap between a cylinder (housing) and a piston (shaft). Such a sealing system is provided with a main seal for preventing the leakage of fluid to be sealed, such as oil, and a dust seal for preventing dust from invading into a hermetic seal area. In general, only one dust seal made of urethane rubber is arranged at an atmospheric air side.

However, in cases where such a sealing system is used under a very severe environment, two dust seals are used while being arranged side by side. Here, note that as an example of a sealing system in the case of being used under a very severe environment, there is a case in which such a sealing system is used in an iron ore mining site, and dust includes, in addition to particulates, frozen substances, substances adhered to the surface of a piston and mud, etc.

Such a sealing system according to a conventional example will be explained with reference to FIG. 8 and FIG. 9. FIG. 8 is a schematic cross sectional view showing the state of the use of the sealing system according to the conventional example. FIG. 9 is a plan view schematically showing a second dust seal in the sealing system according to the conventional example.

The illustrated sealing system according to the conventional example is used for the purpose of sealing an annular gap between an inner peripheral surface of a shaft hole formed in a housing 500, and an outer peripheral surface of a shaft 300 inserted through the shaft hole. In addition, the sealing system according to this conventional example is provided with a main seal 600 for preventing fluid to be sealed from leaking to an atmospheric air side (A), and a dust seal 700 for preventing dust from invading to the side (O) of the fluid to be sealed. In this conventional example, the dust seal 700 is composed of a first dust seal 710 that is formed at the side of the main seal 600, and a second dust seal 720 that is formed at a location nearer to the atmospheric air side than this first dust seal 710.

Here, the housing 500 is composed of a housing main body 510, and a member 520 to be fastened (hereinafter also referred to as a to-be-fastened member) which is constructed so as to be freely fastened and unfastened with respect to this housing main body 510 by means of a bolt or the like.

An annular groove 511 is formed on the inner peripheral surface of the shaft hole in the housing main body 510. The main seal 600 is fitted in this annular groove 511. Here, note that in this conventional example, the main seal 600 is composed of a U-shaped packing 610 of a U shape in cross section, and a back-up ring 620 for protecting an inner peripheral end edge of the U-shaped packing 610 at the atmospheric air side (A).

In addition, an annular concave portion 512 forming a step is formed in an open end portion of the shaft hole in the housing main body 510 at the atmospheric air side (A). The first dust seal 710 is fitted in this annular concave portion 512. The first dust seal 710 is composed of a metal ring 711, and a seal body 712 that is integrally formed with this metal ring 711. This first dust seal 710 is fixed in an axially positioned state by fastening the to-be-fastened member 520.

Moreover, an annular concave portion 521 forming a step is formed in an open end portion of a shaft hole in the to-be-fastened member 520 at the atmospheric air side (A). The second dust seal 720 is fitted in this annular concave portion 521. Similar to the first dust seal 710, the second dust seal 720 is composed of a metal ring 721, and a seal body 722 that is integrally formed with this metal ring 721. This second dust seal 720 is fixed in an axially positioned state by fitting a snap ring 530 into an annular groove formed on an inner peripheral surface of the shaft hole in the to-be-fastened member 520.

In this manner, in the sealing system according to this conventional example, the two dust seals are used while being arranged side by side. Accordingly, it is possible to prevent dust from invading to the side (O) of the fluid to be sealed in a more reliable manner in comparison with the case in which only one dust seal is used.

Here, with respect to the first dust seal 710, there is no part cut in a circumferential direction thereof, similar to common dust seals. As a result, at the time of assembly, an operation of fitting the first dust seal 710 onto the shaft 300 from an end side thereof is needed, or an operation of inserting the shaft 300 into the first dust seal 710 is needed.

In contrast to this, with respect to the second dust seal 720, it is exposed to atmospheric air, so in cases where it is used under a very severe environment, the progress of deterioration thereof is rapid. For example, muddy water or the like would adhere and stick to the seal body 722, or the muddy water or the like adhered to the seal body 722 would be frozen, and when the shaft 300 is caused to slide relative to the seal body 722 in such a state, wear on a seal lip of the seal body 722 would be facilitated.

In this manner, the second dust seal 720 is apt to deteriorate, and hence, is constructed so that it can be replaced with a new one in an easy manner. More specifically, the second dust seal 720 is of a two-piece divided structure. That is, it is composed of a circular body, being circular as seen from an upper surface side, which is cut or divided into two semicircular shaped members, as shown in FIG. 9. With such a structure, each divided member can be detached and attached to the shaft 300 from an outer peripheral side thereof, as a result of which a replacement of the second dust seal 720 can be carried out in a simple manner only by unfastening the to-be-fastened member 520 from the housing main body, then removing the second dust seal 720, which has been deteriorated, attaching a new one, and finally fastening the to-be-fastened member 520 again.

However, the second dust seal 720 is prepared as follows. That is, from the view point of fabrication, a circular body, which is circular as seen from an upper surface side, is first prepared, and is then divided by cutting into two pieces. Here, the second dust seal 720 is provided with the metal ring 721, so in order to cut the metal ring 721, such a cutting has to be made by means of a cutting blade or edge having a certain amount of thickness. Here, note that in general, the cutting is done by the use of a grinder, etc.

As a result, a part of the metal ring 721 and a part of the seal body 722 are chipped off by cutting (C1 and C2 in FIG. 9 indicate the parts to be chipped off). Accordingly, even if the two divided members are joined or combined with each other, a perfect circle can not be formed, and hence, in a state where these members are attached to the housing 500, it can not be avoided that a gap occurs between the cut ends of the members. Specifically, the gap of about 2.5 mm at the maximum occurs. For that reason, the invasion of dust from this gap can not be prevented.

As a measure to cope with this, the applicant of this application has already filed an application (Japanese patent application 2007-63531) with respect to a technique which adopts, as a second dust seal, one which is made of only urethane rubber, and which is cut only at one location in a circumferential direction by means of a thin cutting edge which is so thin as to make a chipping allowance unnecessary.

However, in the case of this technique, the second dust seal has a cut portion, so it is particularly difficult to prevent the invasion of minute or fine dust to a sufficient extent. Once dust enters from the second dust seal, wear of a seal lip thereof will be facilitated, and the invasion of dust will be promoted.

The dust having entered from the second dust seal is prevented from further coming into a main seal side, by means of a first dust seal. However, the dust accumulates in a sealed area between the first dust seal and the second dust seal. The dust thus accumulated in this sealed area, being in a state sealed by the first dust seal and the second dust seal, can not escape from this sealed area. Accordingly, when the amount of accumulation of the dust exceeds a predetermined amount, a load (pressure due to the accumulated dust) is applied to the first dust seal and the second dust seal. Thus, there is a fear that the first dust seal and the second dust seal may be damaged by this load.

The accumulation of dust is more apt to occur in the case of minute dust (i.e., dust having a particle diameter of 10 μm or less) such as particulates than in the case of frozen substances, mud and the like. In addition, in cases where the second dust seal is composed of a relatively hard material such as urethane rubber, such minute dust can also enter not only from the cut portion but also from the tip side of the seal lip.

In this manner, the dust which has entered from the second dust seal and has accumulated becomes a cause of damaging the first dust seal and the second dust seal, thus resulting in a cause of shortening the lives of these dust seals.

Here, note that as related techniques, there are those which are disclosed in a first through a fourth patent document, as listed below.

Prior Art References

Patent Documents

[First Patent Document] Japanese utility model examined publication No. H5-14050
[Second Patent Document] Japanese patent application laid-open No. 2001-355739
[Third Patent Document] Japanese utility model application laid-open No. S59-22360
[Fourth Patent Document] Japanese utility model application laid-open No. H5-83410

SUMMARY OF THE INVENTION

The object of the present invention is to provide a sealing system which is intended to improve its durability.

In order to solve the above-mentioned problems, the present invention adopts the following measures.

That is, the sealing system of the present invention resides in a sealing system which serves to seal an annular gap between an inner peripheral surface of a shaft hole formed in a housing and an outer peripheral surface of a shaft which is inserted through the shaft hole and carries out a reciprocating movement relative to the housing, the system comprising:

a main seal that prevents fluid to be sealed from leaking to an atmospheric air side; and a dust seal that is arranged at a location nearer to the atmospheric air side than the main seal, for preventing dust from invading to a side of the fluid to be sealed;

wherein the dust seal is composed of a first dust seal and a second dust seal which is arranged at a location nearer to the atmospheric air side than the first dust seal, and each of the first dust seal and the second dust seal has a seal lip formed so as to be slidable with respect to the outer peripheral surface of the shaft;

the seal lip of the first dust seal is made of urethane rubber; and the seal lip of the second dust seal is made of a rubber which is higher in flexibility than the urethane rubber, and is composed of only a seal lip that extents toward the atmospheric air side.

Here, the seal lip made of urethane rubber is excellent in the function of scraping dust adhered to the outer peripheral surface of the shaft. On the other hand, the seal lip made of a rubber (e.g., NBR), which is higher in flexibility than urethane rubber, is excellent in the function of suppressing the invasion of fine dust.

In the present invention, as described above, the second dust seal with its seal lip made of a rubber more flexible than urethane rubber is arranged at the atmospheric air side. Accordingly, the invasion of fine dust can be suppressed by means of this second dust seal. In addition, the dust which has invaded from the second dust seal and has adhered to the outer peripheral surface of the shaft is scraped by means of the first dust seal having its seal lip made of urethane rubber. Further, because the seal lip of the second dust seal is composed of only a seal lip extending toward the atmospheric air side, the dust scraped by the first dust seal 100 is discharged to the atmospheric air side from a seal lip tip end side of the second dust seal. Accordingly, it is possible to prevent the dust from accumulating in a sealed area between the first dust seal and the second dust seal, thus making it possible to suppress a load from being applied to these dust seals.

As explained above, according to the present invention, an improvement in durability of a sealing system can be achieved.

BEST MODES FOR CARRYING OUT THE INVENTION

Hereinafter, best modes for carrying out the present invention will be described in detail by way of example based on a preferred embodiment and examples thereof with reference to the accompanying drawings. However, the dimensions, materials, shapes, relative arrangements and so on of component parts described in the embodiment and examples are not intended to limit the scope of the present invention to these alone in particular as long as there are no specific statements.

Embodiment

Figure 1:
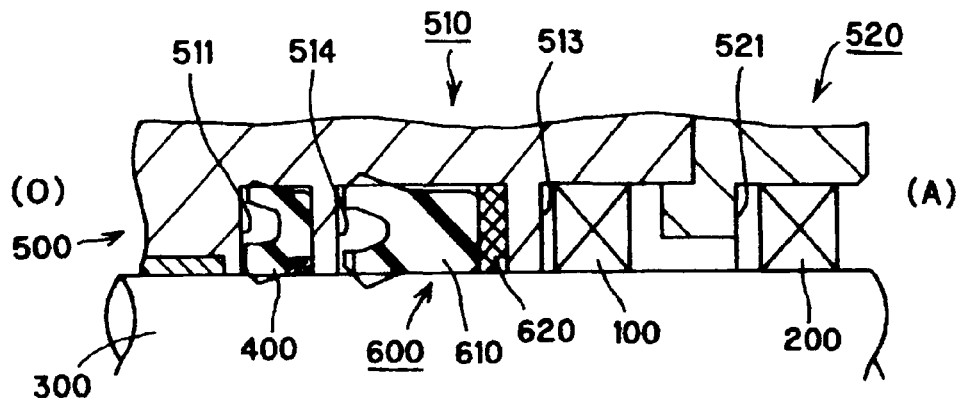
FIG. 1 is a schematic cross sectional view of a sealing system according to an embodiment of the present invention.

A sealing system according to an embodiment of the present invention will be explained with reference to FIG. 1. FIG. 1 is a schematic cross sectional view of a sealing system according to an example of the present invention.

<Sealing System>

The illustrated sealing system according to this embodiment is used for the purpose of sealing an annular gap between an inner peripheral surface of a shaft hole formed in a housing 500, and an outer peripheral surface of a shaft 300 inserted through the shaft hole. The sealing system is used, as a more specific example, for an oil hydraulic cylinder for construction machinery, etc. In the case of the oil hydraulic cylinder, a cylinder corresponds to the housing 500, and a piston corresponds to the shaft 300, wherein the shaft 300 carries out a reciprocating movement in the housing 500.

In addition, the sealing system according to this embodiment is provided with a buffer ring 400 that serves to buffer the pressure of fluid to be sealed (e.g., oil), a main seal 600 that prevents the fluid to be sealed from leaking to an atmospheric air side (A), and a first dust seal 100 and a second dust seal 200 that prevent dust from invading into or entering the side (O) of the fluid to be sealed (hereinafter also referred to as the to-be-sealed fluid side).

Here, the housing 500 is composed of a housing main body 510, and a member 520 to be fastened (hereinafter also referred to as a to-be-fastened member) which is constructed so as to be freely fastened and unfastened with respect to this housing main body 510 by means of a bolt or the like.

A first annular groove 511 and a second annular groove 514 are formed on an inner peripheral surface of the shaft hole in the housing main body 510. In addition, the buffer ring 400 is fitted in the first annular groove 511, and the main seal 600 is fitted in the second annular groove 514. Here, note that in this example, the main seal 600 is composed of a U-shaped packing 610 of a U shape in cross section, and a back-up ring 620 for protecting an end edge of the U-shaped packing 610 at the atmospheric air side (A). The U-shaped packing 610 is provided with a seal lip which slides with respect to the shaft 300.

In addition, an annular concave portion 513 forming a step is formed in an open end portion of the shaft hole in the housing main body 510 at the atmospheric air side (A). The first dust seal 100 is fitted in this annular concave portion 513. Moreover, an annular concave portion 521 forming a step is formed in an open end portion of the to-be-fastened member 520 at the atmospheric air side (A). The second dust seal 200 is fitted in this annular concave portion 521.

<Dust Seals>

The first dust seal 100 is arranged at the side of the main seal 600, and the second dust seal 200 is arranged at a location nearer to the atmospheric air side than this first dust seal 100. In addition, the first dust seal 100 and the second dust seal 200 have no cut portion formed at any location in the circumferential direction thereof.

It is also assumed that the sealing system according to this embodiment is used under a very severe environment such as an iron ore mining site, etc. Accordingly, the dust of which invasion is to be prevented by the dust seals includes, in addition to fine dust such as particulates, those which are apt to adhere to the surface of the shaft 300, such as frozen substances, mud, grains of iron ore, and so on, and those which are large and hard to some extent.

The first dust seal 100 has a seal lip which is formed so as to be slidable with respect to the outer peripheral surface of the shaft 300. In addition, the seal lip of this first dust seal 100 is made of urethane rubber.

Also, the second dust seal 200 has a seal lip which is formed so as to be slidable with respect to the outer peripheral surface of the shaft 300. In addition, the seal lip of this second dust seal 200 is made of a rubber (e.g., NBR) which is more flexible than urethane rubber, and is composed of only a seal lip extending toward the atmospheric air side.

Here, the seal lip made of urethane rubber is excellent in the function of scraping dust adhered to the outer peripheral surface of the shaft 300. On the other hand, the seal lip made of a rubber, which is more flexible than urethane rubber, is excellent in the function of suppressing the invasion of fine dust.

<Advantages of the Seal System according to this Embodiment>

In the seal system according to this embodiment, the second dust seal 200 with its seal lip made of a rubber, which is more flexible than urethane rubber, is arranged at the atmospheric air side. Accordingly, the invasion of fine dust can be suppressed by means of this second dust seal 200.

In addition, the dust which has invaded from the second dust seal 200 and has adhered to the outer peripheral surface of the shaft is scraped by means of the first dust seal 100 having its seal lip made of urethane rubber. Further, because the seal lip of the second dust seal 200 is composed of only a seal lip extending toward the atmospheric air side (A), the dust scraped by the first dust seal 100 is discharged to the atmospheric air side (A) from the side of the seal lip of the second dust seal 200. Accordingly, it is possible to prevent dust from accumulating in a sealed area between the first dust seal 100 and the second dust seal 200, thus making it possible to suppress a load from being applied to these dust seals.

COMPARATIVE EXAMPLES

Hereinafter, comparative examples in the case of changing the construction and materials of seal lips will be explained.

First Comparative Example

In a first comparative example, as a first dust seal, there is adopted one which is the same as in the above-mentioned embodiment of the present invention. In addition, as a second dust seal, there is adopted one in which the same rubber material as in the embodiment of the present invention is used for the material of seal lips thereof, and which has a seal lip extending toward a to-be-sealed fluid side (O) in addition to a seal lip extending toward an atmospheric air side (A).

In this first comparative example, because the seal lip made of a rubber, which is higher in flexibility than urethane rubber, is adopted for the second dust seal, the invasion of fine dust can be prevented in a suitable manner.

However, the invasion of fine dust can not be completely prevented, so fine dust accumulates in a sealed area between the first dust seal and the second dust seal with the passage of time. The dust thus accumulated in this sealed area, being in a state sealed by the first dust seal and the second dust seal, can not escape from this sealed area. Accordingly, there is a fear that a load may be applied to the first dust seal and the second dust seal, thus resulting in the damage of the first dust seal and the second dust seal.

Second Comparative Example

In a second comparative example, as a second dust seal, there is adopted one which is the same as in the above-mentioned embodiment of the present invention. In addition, as a first dust seal, there is adopted one in which a rubber, being higher in flexibility than urethane rubber, is used for the material of seal lips thereof.

In this second comparative example, because the first dust seal and the second dust seal are each provided with seal lips made of a rubber, which is higher in flexibility than urethane rubber, the invasion of fine dust can be prevented in a suitable manner. However, in such seal lips, dust adhered to the outer peripheral surface of the shaft 300 can not be scraped off, so such dust will invade to the side of the main seal 600. Accordingly, the sealing ability of the main seal 600 will be spoiled at an early stage of use.

Third Comparative Example

In a third comparative example, as a first dust seal, there is adopted one which is the same as in the above-mentioned embodiment of the present invention. In addition, as a second dust seal, there is adopted one in which urethane rubber is used for the material of seal lips thereof.

In this third comparative example, because the first dust seal and the second dust seal are each provided with seal lips made of urethane rubber, dust adhered to the outer peripheral surface of the shaft 300 can be scraped off in a suitable manner. However, with these seal lips, the invasion of fine dust can not be suppressed. Accordingly, fine dust is present between the seal lip tip end of each seal and the outer peripheral surface of the shaft 300, so each seal lip will be worn out at an early stage of use.

Fourth Comparative Example

In a fourth comparative example, as a first dust seal, there is adopted one in which a rubber, being higher in flexibility than urethane rubber, is used for the material of seal lips thereof. In addition, as a second dust seal, there is adopted one in which urethane rubber is used for the material of a seal lip thereof.

In this fourth comparative example, because the seal lip of the second dust seal arranged at an atmospheric air side (A) is made of urethane rubber, the invasion of fine dust can not be suppressed so much by means of the second dust seal. Accordingly, dust invades into a sealed area between the first dust seal and the second dust seal. In addition, the seal lip of the second dust seal is composed of only a seal lip extending toward the atmospheric air side (A), but urethane rubber is high in rigidity, so dust can not be caused to discharge to the atmospheric air side (A) in an effective manner, unlike in the case of a seal lip made of a rubber, such as NBR, which is higher in flexibility than urethane rubber. Rather, a seal lip of the first dust seal, which extends toward the atmospheric air side and is made of a rubber, such as NBR, having higher flexibility than urethane rubber, is deformed to a to-be-sealed fluid side (O), thus resulting in the breakage or damage of this seal lip.

Next, some more specific examples of the first dust seal 100 and the second dust seal 200 will be explained.

First Example

Figure 2:
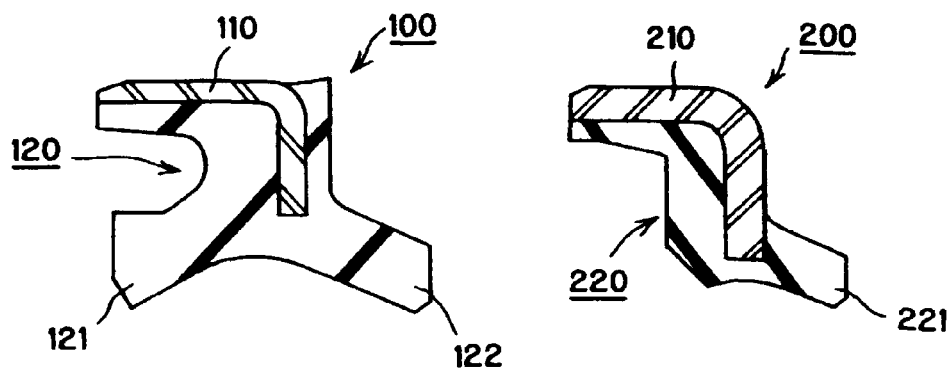
FIG. 2 is a schematic cross sectional view of a first dust seal and a second dust seal according to a first example of the present invention.

A first dust seal and a second dust seal according to a first example of the present invention will be described, while referring to FIG. 2. FIG. 2 is a schematic cross sectional view of the first dust seal and the second dust seal according to the first example of the present invention.

The first dust seal 100 according to this first example is composed of a metal ring 110 having an L-shaped cross section, and a seal body 120 that is integrally formed with this metal ring 110. This seal body 120 is made of urethane rubber, and is provided with a first seal lip 121 that extends to a to-be-sealed fluid side (O), and a second seal lip 122 that extends to an atmospheric air side (A). These first seal lip 121 and second seal lip 122 are each slidable with respect to a shaft 300.

The first seal lip 121 exhibits a function of suppressing the fluid to be sealed, which has leaked from a main seal 600, from leaking to the atmospheric air side (A). In addition, the second seal lip 122 exhibits a function of scraping dust adhered to an outer peripheral surface of the shaft 300.

In addition, the second dust seal 200 according to this first example is composed of a metal ring 210 having an L-shaped cross section, and a seal body 220 that is integrally formed with this metal ring 210. This seal body 220 is made of a rubber (e.g., NBR) which is higher in flexibility than urethane rubber, and is provided with a seal lip 221 that extends to the atmospheric air side (A). The second dust seal 200 exhibits a function of suppressing the invasion of fine dust. Because the seal lip 221 of the second dust seal 200 is constructed to extend to the atmospheric air side (A), it is caused to bend to the atmospheric air side (A) even by a relatively weak force. Accordingly, dust accumulated or collected in a sealed area between the first dust seal 100 and the second dust seal 200 is discharged to the atmospheric air side (A) from a tip end side of the seal lip 221. As a result, it is possible to suppress the load of the dust accumulated in this sealed area from being applied to the first dust seal 100 and the second dust seal 200.

Second Example

Figure 3:
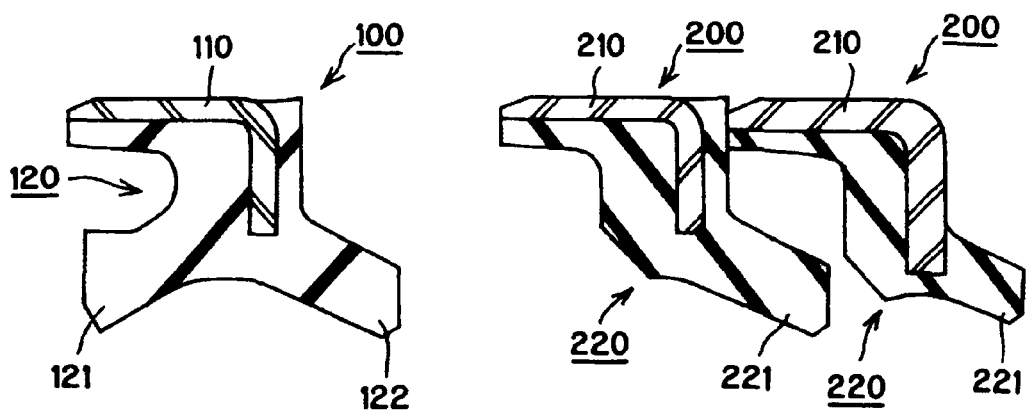
FIG. 3 is a schematic cross sectional view of a first dust seal and second dust seals according to a second example of the present invention.

A first dust seal and second dust seals according to a second example of the present invention will be described, while referring to FIG. 3. FIG. 3 is a schematic cross sectional view of the first dust seal and the second dust seals according to the second example of the present invention.

The first dust seal 100 according to this second example is of the same structure as in the case of the first dust seal in the above-mentioned first example. In this second embodiment, two second dust seals 200 are arranged side by side. Here, note that the structure of each of the second dust seals 200 is the same as that of the second dust seal 200 in the first example.

According to the dust seals of this second example, the invasion of fine dust can be suppressed in a more effective manner, as compared with the case of the first example.

Third Example

Figure 4:
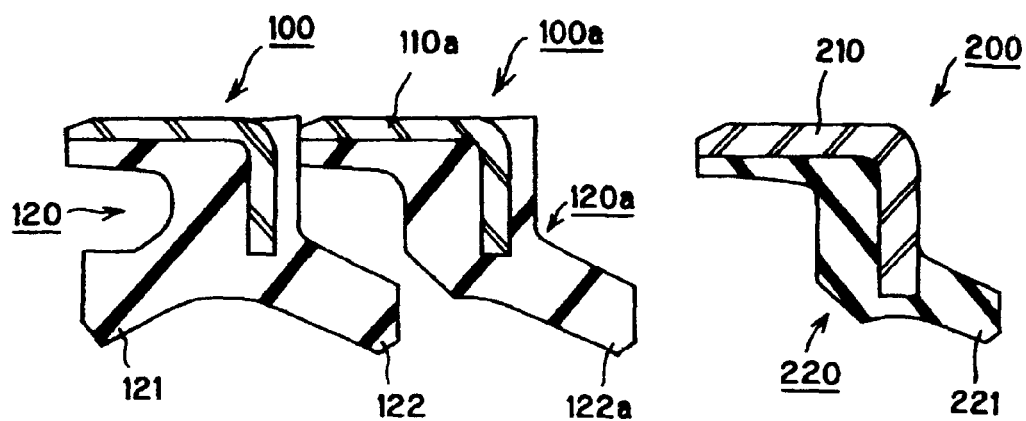
FIG. 4 is a schematic cross sectional view of first dust seals and a second dust seal according to a third example of the present invention.

First dust seals and a second dust seal according to a third example of the present invention will be described, while referring to FIG. 4. FIG. 4 is a schematic cross sectional view of the first dust seals and the second dust seal according to the third example of the present invention.

The second dust seal 200 according to this third example is of the same structure as in the case of the second dust seal in the above-mentioned first example. In addition, in this third embodiment, at an atmospheric air side (A) of a first dust seal 100, which is the same in structure as that of the above-mentioned first example, there is further arranged another first dust seal 100a in a side by side manner, wherein the first dust seal 100a is constructed so as to be different in structure from the first dust seal 100.

This first dust seal 100a is composed of a metal ring 110a having an L-shaped cross section, and a seal body 120a that is integrally formed with this metal ring 110a. This seal body 120a is made of urethane rubber, and is provided with a seal lip 122a that extends to the atmospheric air side (A). This first dust seal 100a is different from the first dust seal 100 in that it is not provided with a seal lip which extends to a to-be-sealed fluid side (O).

The seal lip 122a of the first dust seal 100a exhibits a function of scraping dust adhered to an outer peripheral surface of a shaft.

According to the dust seals of this third embodiment, the dust adhered to the outer peripheral surface of the shaft can be scraped off in a more efficient manner, as compared with the case of the first example. Here, note that the first dust seal 100a is not provided with the seal lip which extends to the to-be-sealed fluid side (O), so the dust scraped by the first dust seal 100 is discharged to the atmospheric air side (A) from a tip end side of the seal lip 122a of the first dust seal 100a.

Fourth Example

Figure 5:
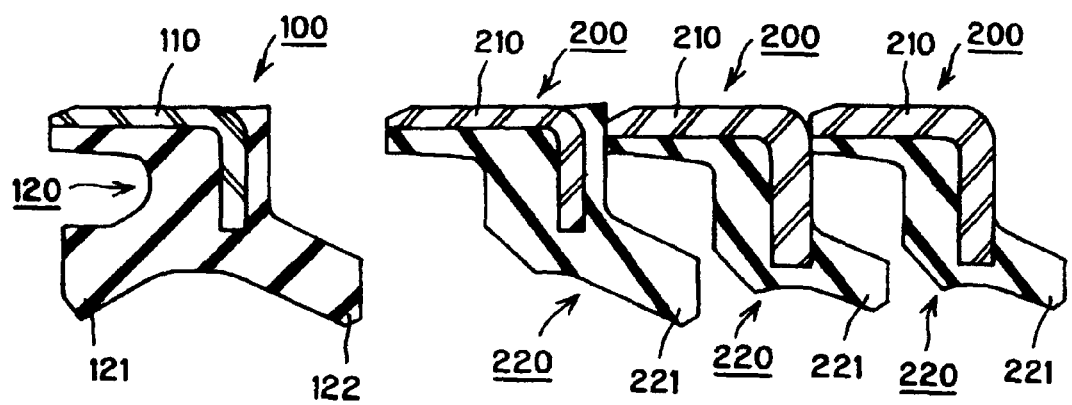
FIG. 5 is a schematic cross sectional view of a first dust seal and second dust seals according to a fourth example of the present invention.

A first dust seal and second dust seals according to a fourth example of the present invention will be described, while referring to FIG. 5. FIG. 5 is a schematic cross sectional view of the first dust seal and the second dust seals according to the fourth example of the present invention.

The first dust seal 100 according to this fourth example is of the same structure as in the case of the first dust seal in the above-mentioned first example. In this fourth embodiment, three second dust seals 200 are arranged side by side. Here, note that the structure of each of the second dust seals 200 is the same as that of the second dust seal 200 in the first example.

According to the dust seals of this fourth example, the invasion of fine dust can be suppressed in a more effective manner, as compared with the case of the second example.

Fifth Example

Figure 6:
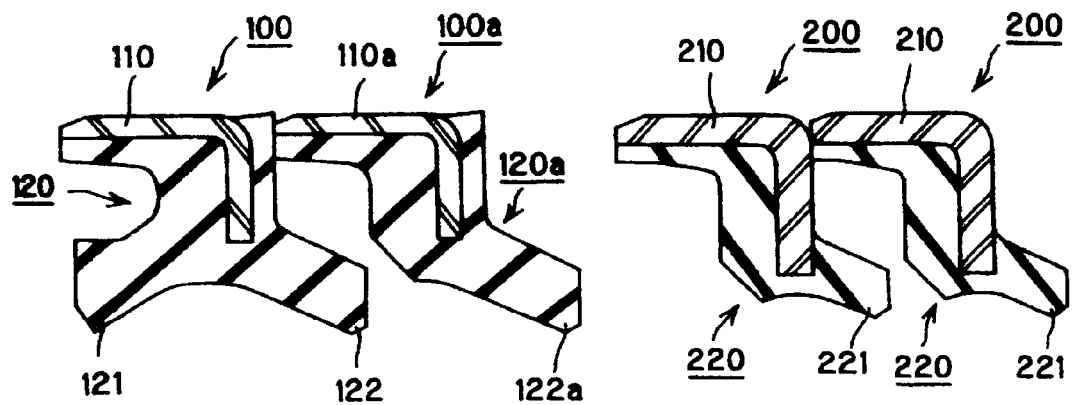
FIG. 6 is a schematic cross sectional view of first dust seals and second dust seals according to a fifth example of the present invention.

First dust seals and second dust seals according to a fifth example of the present invention will be described, while referring to FIG. 6. FIG. 6 is a schematic cross sectional view of the first dust seals and the second dust seals according to the fifth example of the present invention.

In this fifth embodiment, the same structure as in the above-mentioned third example is adopted with respect to the first dust seals. That is, a first dust seal 100 provided with a first seal lip 121 and a second seal lip 122 and another first dust seal 100a provided only with a seal lip 122a extending to an atmospheric air side (A) are arranged side by side.

In addition, the same structure as in the above-mentioned second example is adopted with respect to the second dust seals. That is, two second dust seals of the same structure as that of the second dust seal 200 of the first example are arranged side by side.

According to the dust seals of this fifth example, the invasion of fine dust can be suppressed in a more effective manner, and dust adhered to an outer peripheral surface of a shaft can be scraped off in a more efficient manner, as compared with the case of the first example.

Sixth Example

Figure 7:
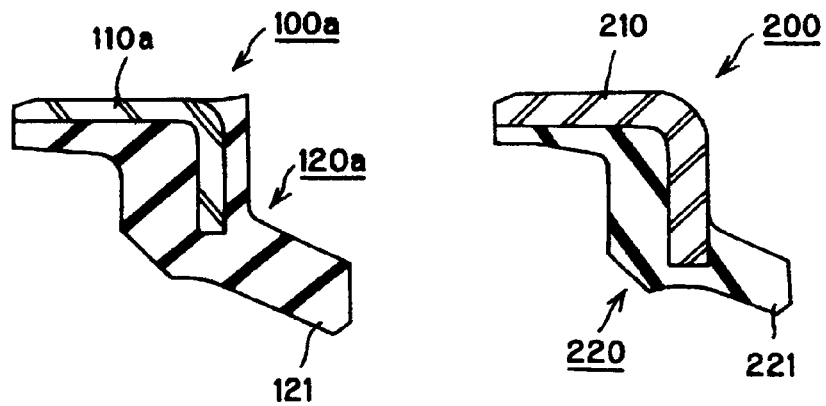
FIG. 7 is a schematic cross sectional view of a first dust seal and a second dust seal according to a sixth example of the present invention.
Figure 8:
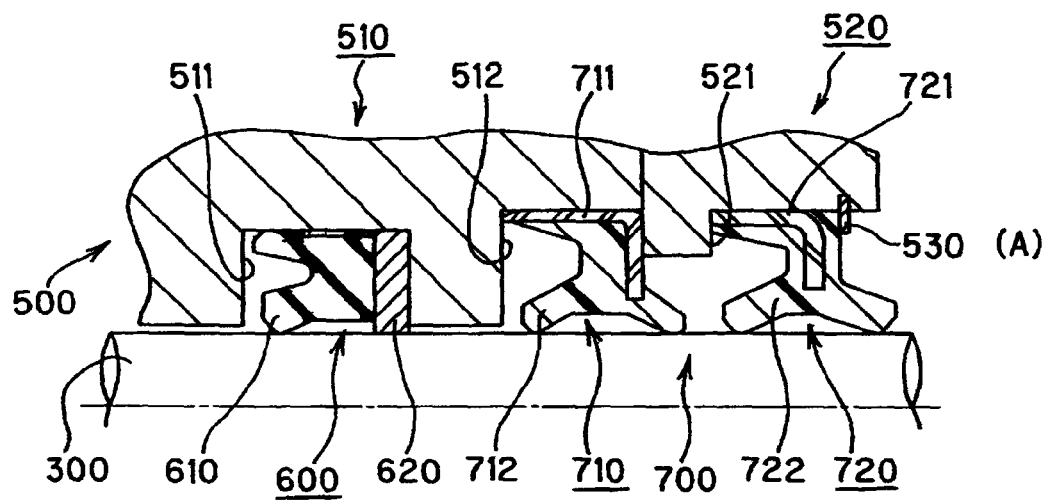
FIG. 8 is a schematic cross sectional view showing the state of the use of a sealing system according to a conventional example.
Figure 9:
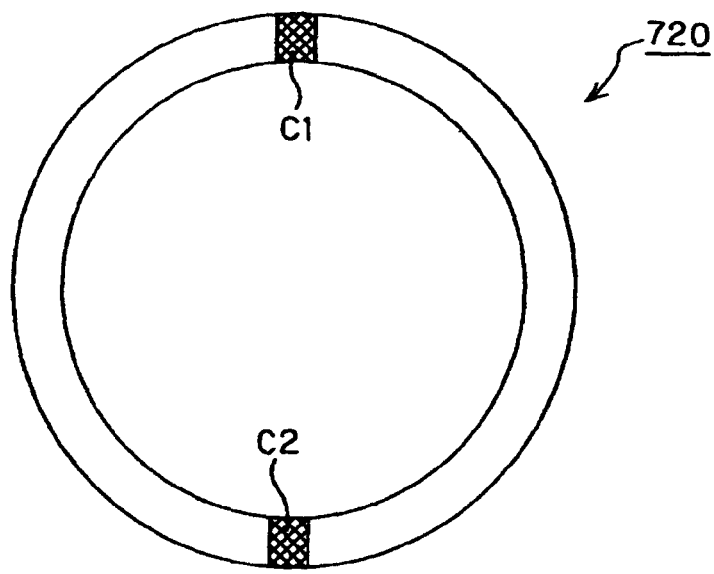
FIG. 9 is a plan view schematically showing a second dust seal in the sealing system according to the conventional example.

A first dust seal and a second dust seal according to a sixth example of the present invention will be described, while referring to FIG. 7. FIG. 7 is a schematic cross sectional view of the first dust seal and the second dust seal according to the sixth example of the present invention.

The second dust seal 200 according to this sixth example is of the same structure as in the case of the second dust seal in the above-mentioned first example. In addition, as the first dust seal 100a according to this sixth embodiment, there is adopted one which is provided only with a seal lip 122a extending to an atmospheric air side (A), as shown in the above-mentioned third and fifth examples.

According to the dust seals according to this sixth embodiment, the same effects as in the case of the above-mentioned first example can be obtained except that the function of suppressing the fluid to be sealed, which has leaked from the main seal 600, from leaking to the atmospheric air side (A) is not provided.

(Others)

In the above-mentioned embodiment, there has been shown a construction in which the first dust seal 100 is fitted in the annular concave portion 513 formed in the housing main body 510, and the second dust seal 200 is fitted in the annular concave portion 521 formed in the to-be-fastened member 520.

However, in cases where two or more first dust seals 100 and two or more second dust seals 200 are used, there is not necessarily a need to fit all the first dust seals 100 in the annular concave portion 513, and to fit all the second dust seals 200 in the annular concave portion 521. In other words, as long as a first dust seal 100, which is arranged at a location nearest to the to-be-sealed fluid side (O), is fitted in the annular concave portion 513, and a second dust seal 200, which is arranged at a location nearest to the atmospheric air side (A), is fitted in the annular concave portion 521, the other dust seals may be fitted in either of the annular concave portions.

While the invention has been described in terms of the preferred embodiment and some examples, those skilled in the art will recognize that the invention can be practiced with modifications within the spirit and scope of the appended claims.

What is claimed is:

1. A sealing system which serves to seal an annular gap between an inner peripheral surface of a shaft hole formed in a housing and an outer peripheral surface of a shaft which is inserted through said shaft hole and carries out a reciprocating movement relative to said housing, said system comprising:
   a main seal that prevents fluid to be sealed from leaking to an atmospheric air side; and
   a dust seal that is arranged at a location nearer to the atmospheric air side than said main seal, for preventing dust from invading to a side of the fluid to be sealed;
   wherein said dust seal is composed of a first dust seal and a second dust seal which is arranged at a location nearer to the atmospheric air side than said first dust seal, and each of said first dust seal and said second dust seal has an axially extending seal lip extending toward said atmospheric air side and formed so as to be slidable with respect to the outer peripheral surface of said shaft;

the seal lip of said first dust seal is made of urethane rubber;
the seal lip of said second dust seal is made of a rubber which is higher in flexibility than said urethane rubber, and is composed of only a seal lip that extents toward the atmospheric air side;
wherein said first dust seal includes a plurality of said first dust seals made of urethane rubber; and
wherein the plurality of said first dust seals contact each other.

2. The sealing system according to claim 1, wherein said second dust seal includes a plurality of second dust seals made of said rubber which is higher in flexibility than said urethane rubber.

3. The sealing system according to claim 2, wherein said plurality of said first dust seals each include a separate metal ring.

4. The sealing system according to claim 2, wherein said first dust seal and said second dust seal each include a separate metal ring.

5. A sealing system which serves to seal an annular gap between an inner peripheral surface of a shaft hole formed in a housing and an outer peripheral surface of a shaft which is inserted through said shaft hole and carries out a reciprocating movement relative to said housing, said system comprising:

a main seal that prevents fluid to be sealed from leaking to an atmospheric air side; and
a dust seal that is arranged at a location nearer to the atmospheric air side than said main seal, for preventing dust from invading to a side of the fluid to be sealed;
wherein said dust seal is composed of a first dust seal and a second dust seal which is arranged at a location nearer to the atmospheric air side than said first dust seal, and each of said first dust seal and said second dust seal has an axially extending seal lip extending toward said atmospheric air side and formed so as to be slidable with respect to the outer peripheral surface of said shaft;
the seal lip of said first dust seal is made of urethane rubber;
the seal lip of said second dust seal is made of a rubber which is higher in flexibility than said urethane rubber, and is composed of only a seal lip that extents toward the atmospheric air side;
wherein said second dust seal includes a plurality of second dust seals made of said rubber which is higher in flexibility than said urethane rubber; and
wherein the plurality of said second dust seals contact each other.

6. The sealing system according to claim 5, wherein said plurality of said second dust seals each include a separate metal ring.

* * * * *